(12) United States Patent
Schultz (10) Patent No.: US 7,771,200 B2
(45) Date of Patent: Aug. 10, 2010

(54) DEVICES WITH PUSH BUTTON-TYPE MECHANISM AND METHODS FOR USING SAID DEVICES

(75) Inventor: Lucy Schultz, Granger, IN (US)

(73) Assignee: Innovative USA, Inc., Norwalk, CT (US)

(*) Notice: Subject to any disclaimer, the term of this patent is extended or adjusted under 35 U.S.C. 154(b) by 914 days.

(21) Appl. No.: 11/339,355

(22) Filed: Jan. 25, 2006

(65) Prior Publication Data

US 2007/0170650 A1 Jul. 26, 2007

(51) Int. Cl.
*G09B 19/02* (2006.01)

(52) U.S. Cl. ...................................................... 434/188

(58) Field of Classification Search ................ 434/188, 434/191, 198, 200, 205, 129, 403, 407; 273/296, 273/299, 302; 116/300

See application file for complete search history.

(56) References Cited

U.S. PATENT DOCUMENTS

| | | | | |
|---|---|---|---|---|
| 2,304,893 | A | * 12/1942 | Dickson | ...................... 434/200 |
| 2,461,811 | A | * 2/1949 | Cusano | ........................ 235/123 |
| D163,085 | S | * 5/1951 | Bishop | ...................... D21/479 |
| 3,456,948 | A | * 7/1969 | Bosco | ........................ 273/287 |
| 3,789,517 | A | * 2/1974 | Romstad | ..................... 434/199 |
| 3,935,649 | A | 2/1976 | Harte | |
| 4,045,013 | A | * 8/1977 | Coster | ........................ 273/281 |
| 4,050,698 | A | 9/1977 | Brown | |
| 4,258,477 | A | 3/1981 | Ishiyama | |
| 4,496,058 | A | 1/1985 | Harris et al. | |
| D310,175 | S | * 8/1990 | Nugent | ...................... D10/46.1 |
| 5,040,987 | A | * 8/1991 | Frazier | ........................ 434/188 |
| 5,066,234 | A | * 11/1991 | LeDesma | ..................... 434/205 |
| 5,167,505 | A | * 12/1992 | Walsh | ........................ 434/205 |
| 5,205,474 | A | 4/1993 | Stuart et al. | |
| 5,311,834 | A | * 5/1994 | Ross | .......................... 116/306 |
| 5,423,682 | A | 6/1995 | Hildebrandt | |
| 5,749,734 | A | 5/1998 | Kohlberg | |
| 5,772,212 | A | 6/1998 | Hagedorn | |
| 5,782,628 | A | * 7/1998 | Alioto | ........................ 434/200 |
| 5,868,393 | A | * 2/1999 | Williams | ..................... 273/299 |
| 5,938,242 | A | * 8/1999 | Ryan | ........................... 281/38 |
| 5,954,204 | A | 9/1999 | Grabowski | |
| 5,980,258 | A | 11/1999 | Kohlberg | |
| 6,132,216 | A | * 10/2000 | Muntean et al. | ............. 434/191 |
| 6,169,876 | B1 | 1/2001 | Larson et al. | |
| 6,206,701 | B1 | 3/2001 | Kohlberg | |
| 6,705,467 | B1 | 3/2004 | Kancsar | |
| 6,938,768 | B2 | * 9/2005 | Ferretti et al. | ............. 206/459.1 |
| 6,951,353 | B2 | * 10/2005 | Kozlowski et al. | ............. 283/81 |

* cited by examiner

*Primary Examiner*—Kurt Fernstrom
(74) *Attorney, Agent, or Firm*—Locke Lord Bissell & Liddell, LLP; Alan B. Clement; Peter J. Fallon (57) ABSTRACT

The present invention relates to a device having a push button-type mechanism and also relates to methods for using such devices. The push button-type mechanism to be used has at least two variable positions that can be changed by the user to mark the occurrence of an event. The device is useful for teaching or learning as well as for meeting non-educational needs such as filling household grocery lists, recipes, miscellaneous lists, and work status sheets in the manufacturing and service industries. The device may be contained on pages of a book and/or cards and/or a plate.

41 Claims, 9 Drawing Sheets

DEVICES WITH PUSH BUTTON-TYPE MECHANISM AND METHODS FOR USING SAID DEVICES

FIELD OF INVENTION

The present invention broadly relates to a device having a push button-type mechanism and a method for using such devices. More particularly, the present invention relates to a device having at least one push button-type mechanism with at least two variable positions that can be changed by the user to mark the occurrence of an event, such as, but not limited to marking digits as a user counts and/or allowing a user to see relationships making the device eminently useful for teaching or learning, such as in the context of counting or simple math and fractions. Educational needs, however, are not the sole use of this type of invention. Other exemplary uses would include, but are not limited to, household grocery lists, recipes, miscellaneous lists and work status sheets in the manufacturing and service industries. The device may be contained on pages of a book and/or cards and/or a flat surfaced device.

BACKGROUND OF INVENTION

Over the years, a variety of aids and methods have been used to help teach or learn counting and simple math including, but not limited to, books, flash cards and a variety of toys and games. Such aids and methods are particularly useful in teaching children. However, educational methods are not the sole uses for this type of invention and the invention is not so limited. Other exemplary uses would include, but are not limited to household grocery lists or recipes, miscellaneous lists, and work status sheets in the manufacturing and service industries.

Conventional books, flash cards and games have met with varying degrees of success in providing an educational and entertaining tool. While books, flash cards and games can be useful with the assistance and in the presence of an instructor, they are not usually fun or motivating. Also, they do not provide a simple to manufacture means for the user to use a built in manipulative indicator, which possesses sufficient durability and enhances the learning process and makes learning less abstract and more concrete. Other educational methods are too complex, difficult to use and/or not fun and, therefore, do not successfully accomplish their objectives.

Aids of the aforementioned types take many forms. For instance, U.S. Pat. No. 3,935,649 to Harte discloses one or more plates with recessed areas for inserting counting bars of various lengths and designated values to teach counting and mathematical functions. U.S. Pat. No. 4,050,698 to Brown teaches a deck of cards for assisting of the improvement in learning skills such as counting. By way of further example, U.S. Pat. No. 5,423,682 to Hildebrandt teaches an aid for counting utilizing numbered blocks slidable on rods held in frame.

No prior art, however, teaches or suggests using a device having at least one push button-type mechanism with two variable positions that can be changed by the user to mark an occurrence and allow the user to see relationships, which is useful for teaching or learning counting, simple math, fractions, reading, sorting, matching, or making, creating or recognizing pictures and/or patterns and for non-educational purposes. The use of the push button mechanism may be both tactile and auditory, further increasing the entertainment, educational or general utility of the invention. The ability of the user to see, feel and/or hear the device recording the occurrence of the event, be it counting or other designating the completion of a task, significantly increases the utility of the device.

SUMMARY OF INVENTION

The present invention concerns a device with at least one push button-type mechanism having at least one switch with at least two variable positions that can be changed by the user to mark that an event has occurred such as, but not limited to, marking digits as a user counts and/or allowing a user to see mathematical relationships.

It is an objective of the present invention to provide a device that is compact, portable and easy to carry.

It is still a further objective of this invention to provide a device that is durable, effective, easy to use and relatively cost-efficient to manufacture.

It is also an objective of the present invention to provide a useful device that stimulates the desire of a child or other user to learn.

It is a further objective of the present invention to provide a device that entertains the user.

These and other objectives will become evident to those skilled in the art from the specification.

BRIEF DESCRIPTION OF THE INVENTION

DETAILED DESCRIPTION OF THE INVENTION

The following description of preferred embodiments is presented to illustrate the present invention and is not to be construed to limit the scope of the claims in any manner whatsoever.

For purposes of illustration, many of the embodiments described below are described with reference to a child and the subjects of counting, simple math and fractions. Although children, counting, simple math and fractions are discussed in detail, it is to be understood that the user of the invention could be of any age and the invention could be used to teach other mathematical functions such as grouping and borrowing; or even non-mathematical functions, such as, but not limited to, reading, sorting, matching, or making, creating or recognizing pictures or patterns, as well as a calendar or game requiring marking or elimination of an object or objects. However, educational methods are not the sole uses of this invention and the claims should not be limited to educational methods. Other exemplary uses include, but are not limited to, household grocery or recipe lists, miscellaneous lists, and work status sheets in the manufacturing and service industries.

Figure 1:
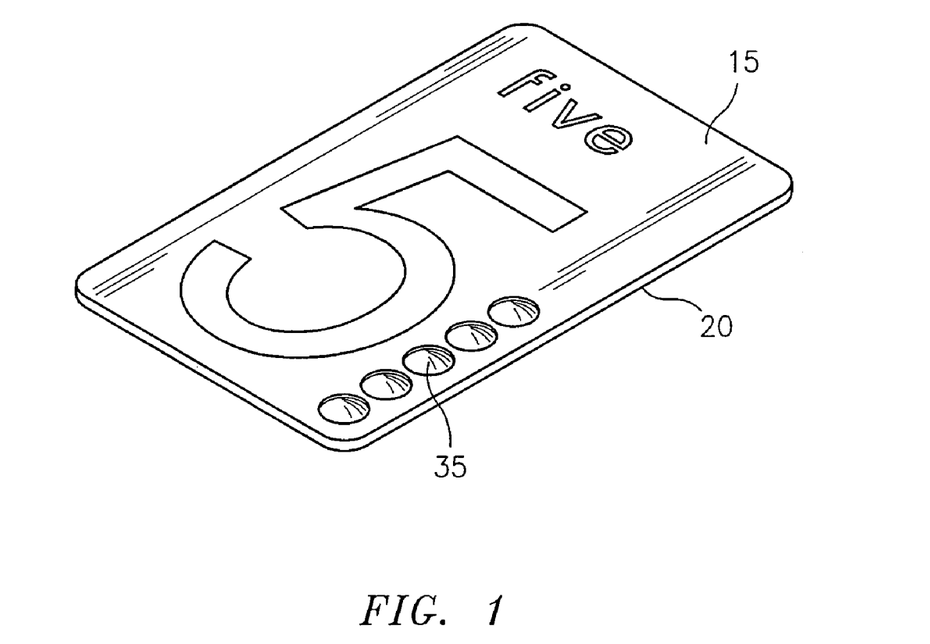
FIG. 1 depicts a top view of a preferred flash card embodiment of the present invention.

FIG. 1 depicts a top view of one flash card comprising a push button-type mechanism of the present invention, which may be part of a set or deck of flash cards. The term "set" or "deck" as used herein refers to one or more flash cards. The flash card depicted comprises a front 15 and a back 20 and at least one push button-type mechanism 35. Either or both the front and back of the card may have at least one word, number, graphic or combination thereof on it. The text or graphics may represent one or more numbers, one or more fractions or one or more math equations. FIG. 1 depicts the number "5" and word "five." However, at least one side of the card could also include suitable graphics, for example, a star with five points or five separate objects.

The depicted embodiment is rectangular in shape and approximately 3.5 inches by 7 inches. However, the card may be of any suitable dimensions or shape. The front 15 and back 20 may be constructed of any material known to those skilled in the art that provides sufficient rigidity and printability. These materials may include, but are not limited to, paper, cardboard, textiles, foam or plastics or any combination thereof. Preferred is cardboard that is about 0.030 of an inch thick but may also be as thin as about 0.006 inches. The construction of the push button-type mechanism is explained below.

Figure 2:
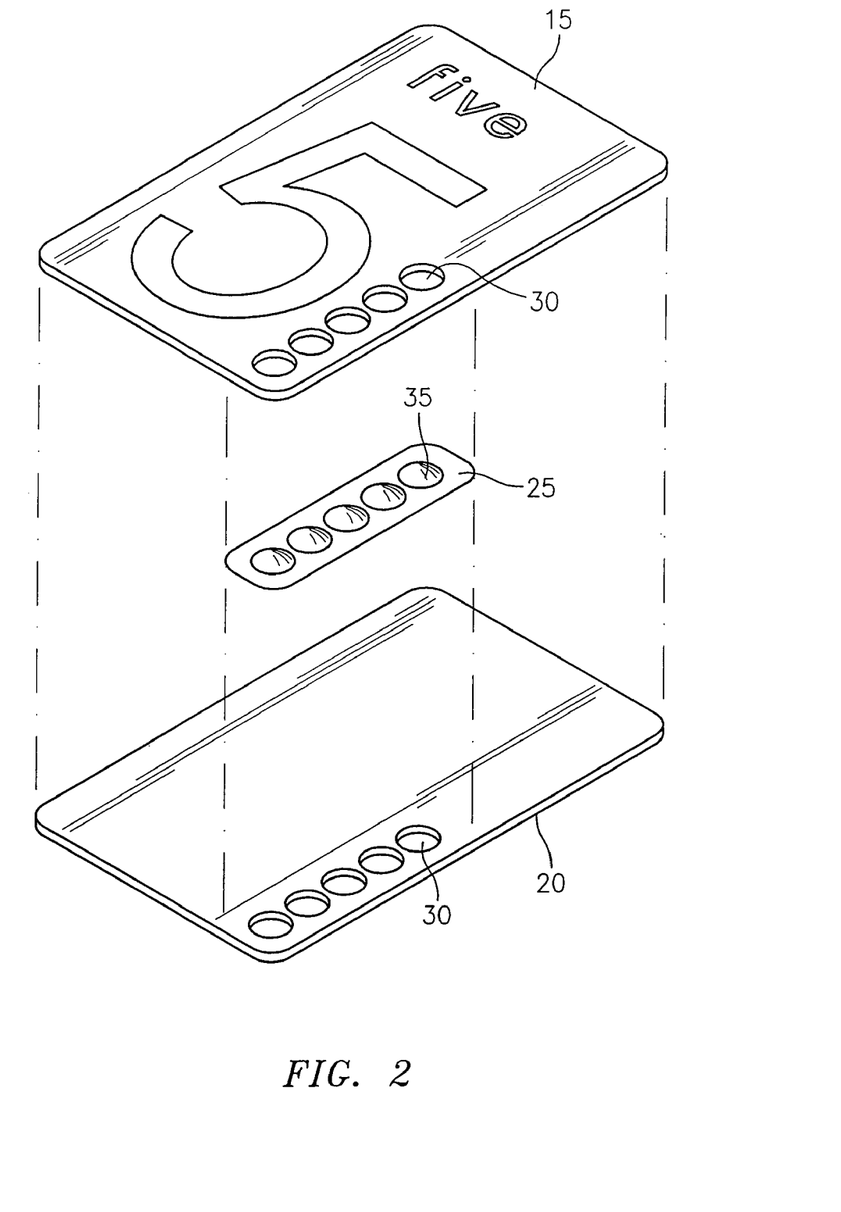
FIG. 2 depicts an exploded view of the preferred flash card embodiment of the present invention depicted in FIG. 1.

FIG. 2 depicts an exploded view of the embodiment of the present invention depicted in FIG. 1. In the depicted embodiment, a push button-type mechanism 25 is sandwiched between the front 15 and a back 20 before the front and back are adhered to one another. The front 15 and a back 20 may be attached to one another using glue or any suitable means known to those skilled in the art. Further, in the depicted embodiment the front cover and back of the card have windows 30 that allow the access to the buttons 35 of the push button type mechanism 25. In other embodiments, however, the mechanism need not be a separate part but may comprise the front or back, in which case no windows are needed (see, e.g., FIG. 10). In the depicted embodiment, the number and location of windows will depend upon the number of push button type-mechanisms and their location. In the depicted embodiment, one push button-type mechanism 25 is used that has five buttons 35. In other embodiments, two or more mechanisms may be used to obtain the desired number of buttons. For example, five mechanisms each with one button (see FIG. 3) may be used to obtain the five buttons depicted.

Figure 3:
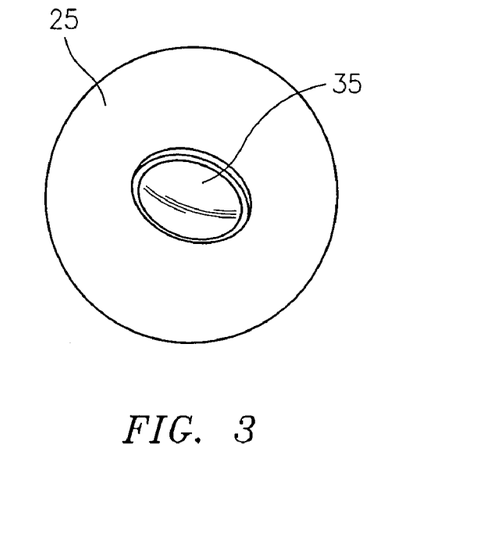
FIG. 3 depicts a preferred embodiment of a push button-type mechanism useful in the present invention.
Figure 4A:
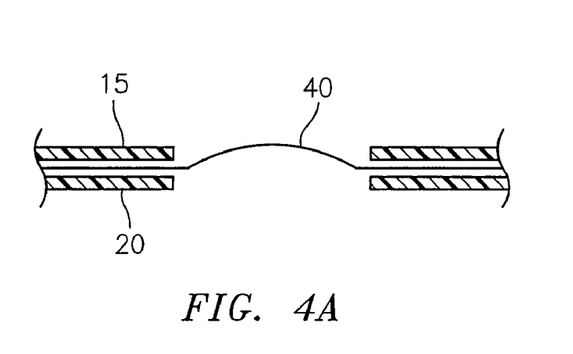
FIG. 4A depicts the preferred embodiment of push button-type mechanism of FIG. 3 with the button in position 1.
Figure 4B:
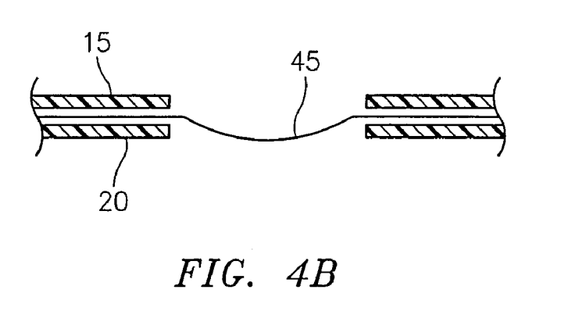
FIG. 4B depicts the preferred embodiment of push button-type mechanism of FIG. 3 with the button in position 2.

FIG. 3 depicts an embodiment of a push button-type mechanism 25 of the present invention. FIG. 3 shows the push button-type mechanism 25 with button 35. In the depicted embodiment, the mechanism and the button are formed from a piece of plastic with the button comprising a reversible protrusion in the plastic. As depicted in FIGS. 4A and 4B, the button has two variable positions. That is, when viewed from the front of the card 15, the button is convex in position one 40 and concave in position two 45. The user can change the position of the button from convex to concave by depressing the convex side when the button is in the convex position and vice versa. Although the embodiment depicted in FIG. 3 shows a mechanism formed from a plastic disc, the push button-mechanism may be of any shape and can have any number of buttons as exemplified by the switching mechanism depicted in FIG. 2. Further, the buttons may be in any suitable shape or combination of shapes.

The push button-type mechanism may be constructed of any material known to those skilled in the art that is durable and pliable, such that the button can be pressed from a concave to convex position on multiple occasions without failure of the substrate material. These materials may include, but are not limited to, plastics or metals. Preferred is plastic that is about 0.062 of an inch thick but may also be as thin as about 0.005 inches. The button may be formed by any means known to those skilled in the art. These means may include, but are not limited to injection molding, vacuum forming, rotational molding or sheet metal embossing.

In especially preferred embodiments, the material of construction is designed so that the button makes a "clicking-type" noise when depressed. For example, it is known to those of ordinary skill in the molding art that one can mold a dome shaped button of plastic materials such that when they are depressed, the act of inversion of the material also causes a clicking noise to be made. Other methods are known in the art to create such a clicking or popping noise. The inclusion of such methods in the context of the present invention provides the user with a both a tactile (feeling the button being pushed), visual (seeing the button in a depressed state) and auditory indication (hearing the clicking or popping noise) of noting the occurrence of an event. This combination is a particularly advantageous feature of the present invention as it adds to the enjoyment, educational and utilitarian nature of the devices of the present invention. As a non-limiting example, for instance, when a child counts a series of stationary objects, a child may miscount by forgetting which of the objects has already been counted. The use of the present invention significantly overcomes that problem by providing the child with the tactile, visual and/or auditory notation of having already counted the item. The child will have felt pushing a particular button, will have heard it click or pop and will be able to see for certain that that item already was counted by virtue of the fact that the button is already in the depressed state. Such features apply equally to uses of the present invention for grocery items or to-do lists, etc.

In addition, the number of buttons used on the card can vary. In the depicted embodiment, the card bears the number five and five buttons are used. To operate the depicted embodiment, the user could change the position of the buttons from convex to concave (or concave to convex) as she or he counts from 1 to 5. However, it also is possible to have more buttons than the number represented on the card. For example, a series of cards each having different numbers represented on them could each have ten switches. To operate such an embodiment, the user could change the position of the buttons from convex to concave as she or he counts from 1 to the number represented on front or back of the card. The use of the buttons allows the user to mark the digits as the user counts and/or to see mathematical relationships. By way of further example, at least one side of the card could represent a fraction and have the number of buttons corresponding to the denominator of the fraction and the user could be asked to activate the number of buttons that correspond to the numerator thereby allowing the user to visualize the fraction.

Figure 5:
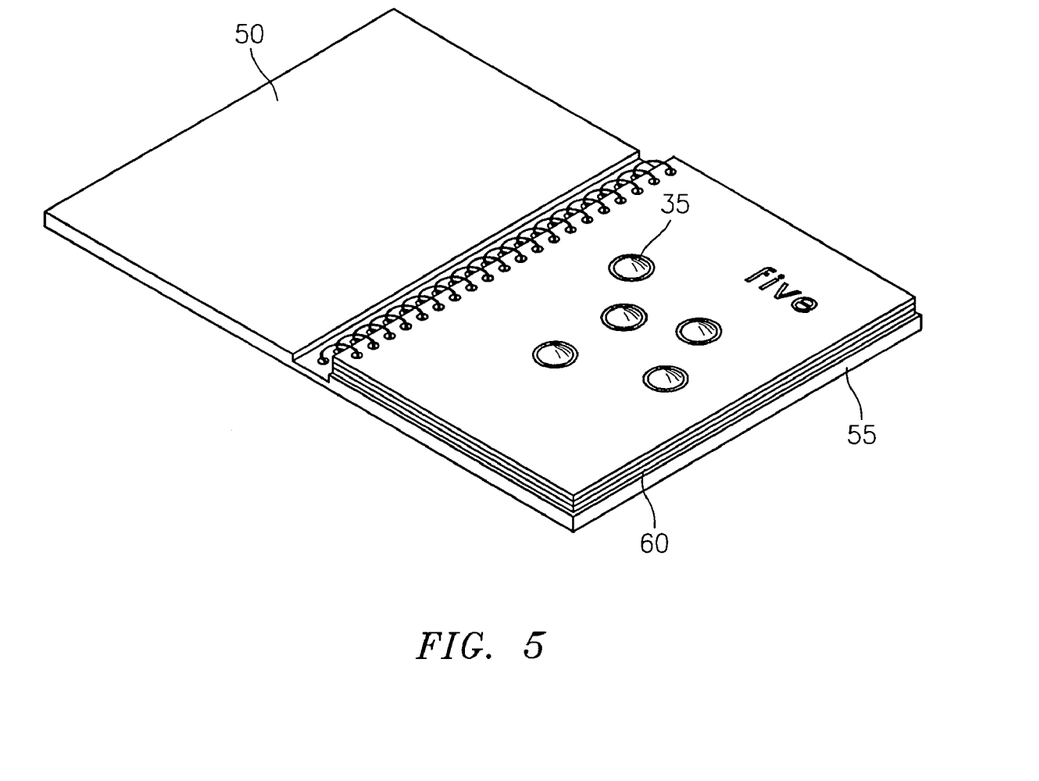
FIG. 5 depicts a top view of a preferred book embodiment of the present invention having a push button-type mechanism.

FIG. 5 depicts a top view of a book embodiment of the present invention having at least one page that uses a push button-type mechanism. The book depicted comprises a front cover 50, a back cover 55 and at least one leaf 60 having at least one button 35. In the depicted embodiment, the front cover integrally is attached to the back cover. However, any means for connecting the back cover to the front cover known in the art may be employed in practicing the present invention, including glue adhesion, ring binding, male/female mating-type bindings, spiral bindings, stitching, and slide-on type clip bindings. Further, the book may be bound in concertina or other fashion. In the depicted embodiment, the leaves are bound by a spiral binding. However, any means for connecting the back cover to the front cover known in the art may be employed in practicing the present invention, including glue adhesion, ring binding, male/female mating-type bindings, stitching, and slide-on type clip bindings.

Either or both the front and back of the leaf may have at least one word, number, graphic or combination thereof on it. The text or graphics may represent one or more numbers, one or more fractions or one or more math equations. FIG. 5 depicts the word "five." However, at least one side of the leaf could also include suitable graphics, for example, a hand with a number of fingers extended or five separate objects.

The book may be of any suitable dimensions. For example, in some embodiments, the book may be about 8 inches wide and about 11 inches long. The front 15 and back 20 may be constructed of any material known to those skilled in the art that provides sufficient rigidity and printability. These materials may include, but are not limited to, paper, cardboard, textiles, foam or plastics or any combination thereof. Preferred is cardboard that is about 0.030 of an inch thick but may also be as thin as about 0.006 inches. The construction of the push button-type mechanism and the operation of the book preferably is as explained above in connection with FIG. 3.

Figure 6:
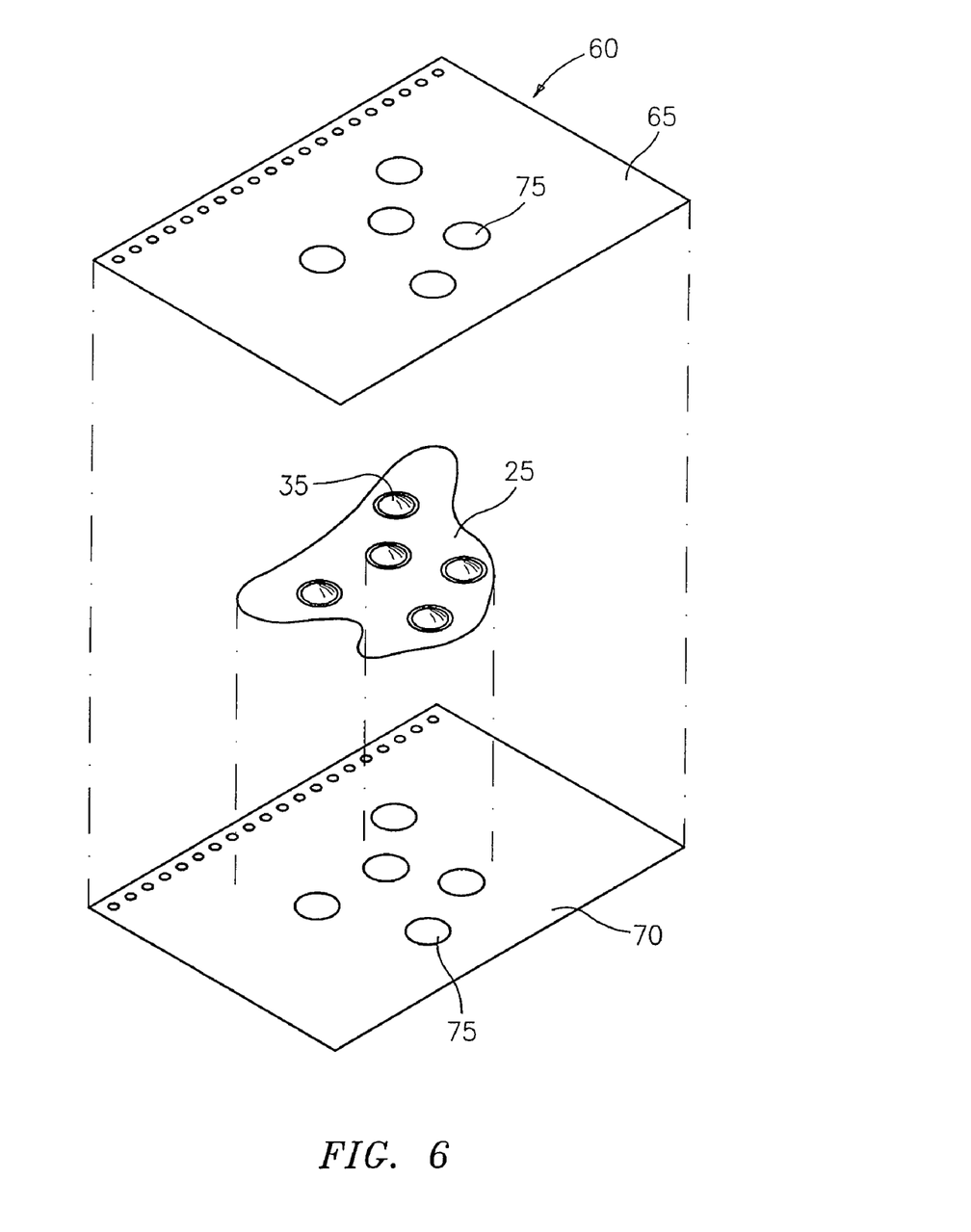
FIG. 6 depicts an exploded view of a page depicted in FIG. 5 including a preferred embodiment of the push button-type mechanism of the present invention.

FIG. 6 depicts an exploded view a leaf of the embodiment of the present invention depicted in FIG. 5. In the depicted embodiment, a push button-type mechanism 25 is sandwiched between the top page 65 and bottom page 70 of the leaf 60 before the top page and bottom page are adhered to one another. The top page 65 and bottom page 70 may be attached to one another using glue or any suitable means know to those skilled in the art. Further, the top page 65 and bottom page 70 have windows 75 that allow access to the buttons 35 of the switching mechanism 25. In other embodiments, however, the mechanism need not be a separate part but may comprise the front or back, in which case no windows are needed (see, e.g., FIG. 10). The number and location of windows will depend upon the number of buttons and their location. In the depicted embodiment, one push button-type mechanism 25 is used that has five buttons 35. In other embodiments, two or more push button-type mechanisms may be used to obtain the desired number of buttons. For example, five mechanisms each with one button (see FIG. 3) may be used to obtain the five buttons depicted. The mechanisms and/or the buttons may be of any suitable size or shape.

Figure 7:
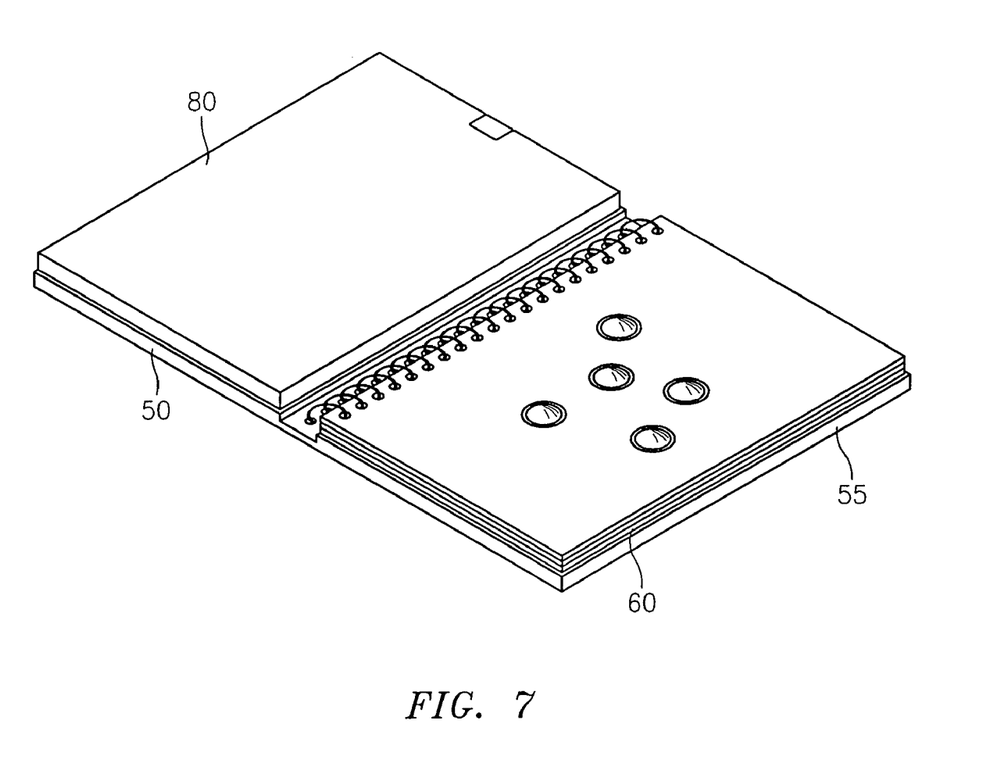
FIG. 7 depicts another preferred book embodiment of the present invention.

FIG. 7 depicts another embodiment of the present invention wherein a compartment 80 is attached to a cover of the book. Although FIG. 7 depicts one compartment 80 as being attached to the inside of the front cover 50 of the book, one or more compartments may be provided. Further, the compartment(s) 80 may be attached elsewhere on the book, for example, on the front of the front cover or on either or both sides of the back cover 55 of the book. The compartment(s) 80 may be removably attached to the book by the use of Velcro or any other suitable means know to those skilled in the art. In other embodiments, the compartment(s) may be permanently affixed to the book by glue or any other suitable binding means know to those skilled in the art. The compartment(s) may be constructed of cardboard or any other suitable material known to those skilled in the art.

The compartment(s) 80 may be used to house media related to the theme of the book such as, but not limited to, one or more audiotapes, videotapes, compact disks, DVDs or CD ROMs or combinations thereof. The compartment(s) may also be used to house flash cards or complementary manipulative device(s) including, but not limited to, one or more flat surfaced devices or plates. In such embodiments, either or both the flash cards (and/or other complementary manipulative devices) or the one or more book leaves may utilize at least one push button-type mechanism of the present invention.

Figure 8:
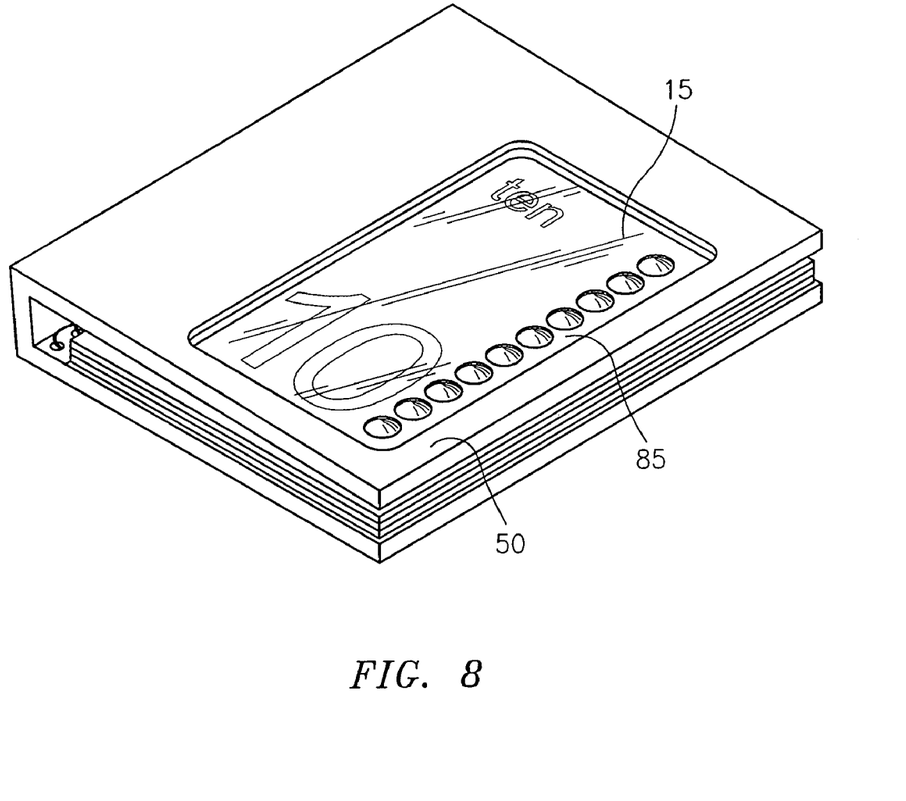
FIG. 8 depicts another view of a preferred embodiment of the present invention wherein flash cards comprising the push button-type mechanism of the present invention are provided with a book.
Figure 9:
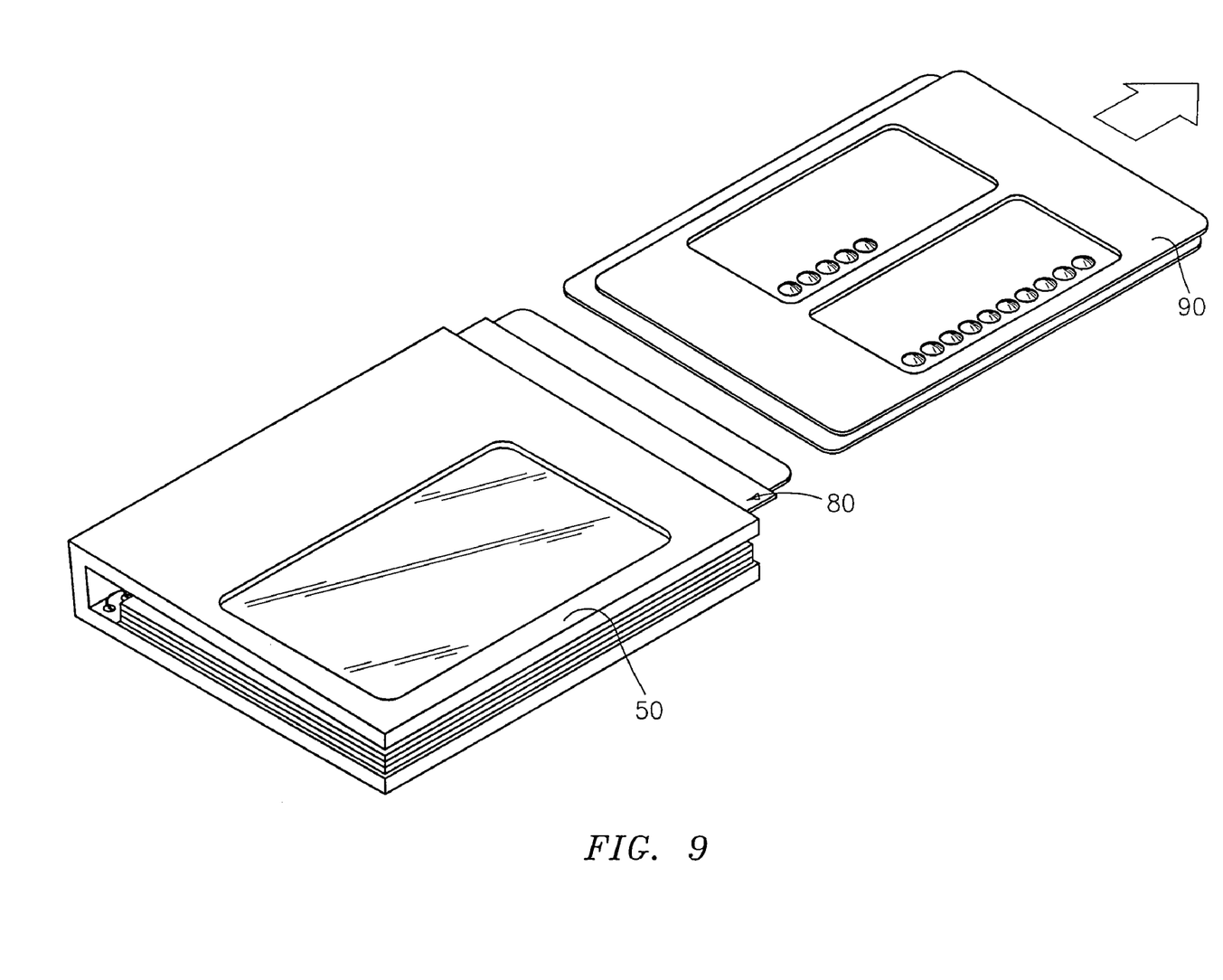
FIG. 9 depicts another view of the preferred embodiment depicted in FIG. 8.

FIG. 8 depicts another view of the embodiment of the present invention wherein flash cards are provided with a book. In the embodiment depicted in FIG. 8, the front side of the front cover 50 has a transparent pane 85 through which the front of a flash card 15 is visible. FIG. 9 depicts another view of the embodiment depicted in FIG. 8 having a tray 90 for holding media or complementary manipulation device(s) that can be removed from the compartment 80.

Figure 10:
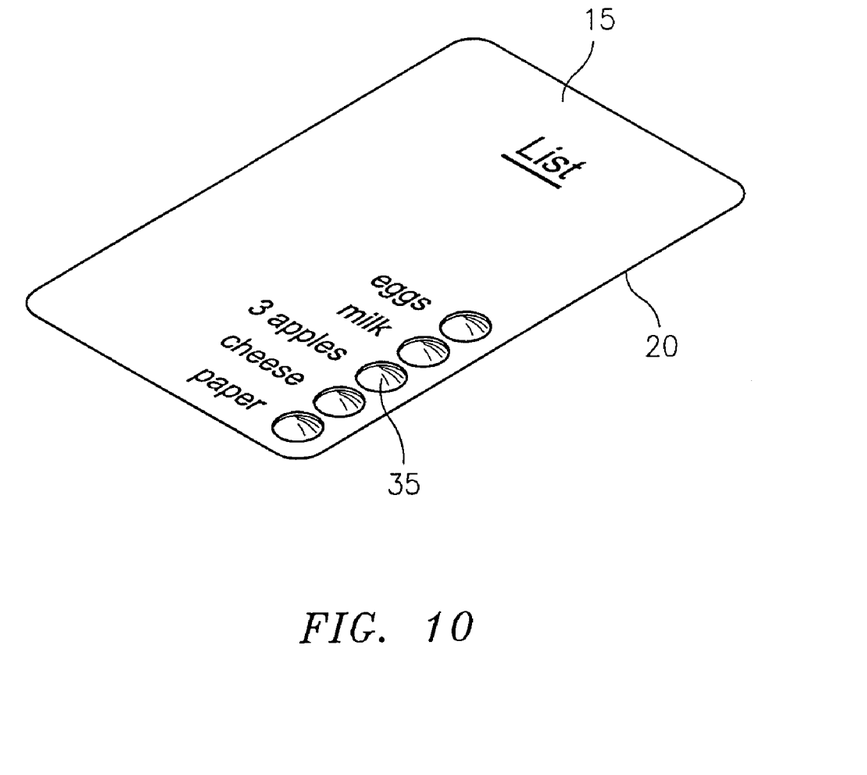
FIG. 10 depicts a top view of an embodiment of the present invention wherein the mechanism is used with a flat surfaced device and a checklist.

FIG. 10 depicts a top view of an embodiment of the present invention wherein the mechanism is used with a flat surfaced device and a checklist. Depicted therein is a plate that comprises a front 15 and a back 20 and at least one push button-type mechanism 35. Either or both the front and back may have at least one word, number, graphic or combination thereof on it. In this case, the text or graphics represents food items and quantities. However, at least one side of the card could also include suitable graphics, for example, a fruit. The graphics may be permanently on the plate or can be graphics that can varied by the user.

The depicted embodiment is square and approximately 3.5 inches by 3.5 inches. However, the plate may be of any suitable dimensions or shape and may be constructed of any material known to those skilled in the art that provides sufficient rigidity and printability. These materials may include, but are not limited to, paper, cardboard, textiles, foam or plastics or any combination thereof. As depicted, the plate may be made from one continuous piece of material that has the push button-type mechanism molded therefrom. In other embodiments, the plate may be made from more than one material and/or comprise one or more parts. See, e.g., FIG. 2. The construction of the push button is explained above. To operate this embodiment, the user may check off the items as they are gathered by manipulating the buttons.

Many variations of the present invention will suggest themselves to those skilled in the art in light of the above-detailed description. All such obvious modifications are within the full-intended scope of the claims.

I claim:

1. A deck of flash cards wherein at least one card comprises:
   a front having at least one window;
   a back having at least one window, with the proviso that the front and back windows are located at a position that correspond to each other; and
   at least one mechanism located between said front and back of the card, said mechanism having at least one button that is operable between two variable positions and is accessible through the front and back windows,
   wherein the front and back are adhered to one another and the mechanism having at least one button is made of a material that provides a clicking and/or popping noise when the position is changed.

2. A deck of flash cards as defined in claim 1 wherein said mechanism is comprised of plastic and said buttons are reversible protrusions in said plastic.

3. A deck of flash cards as defined in claim 2 wherein said buttons are circular in shape and the two variable positions are convex and concave.

4. A deck of flash cards as defined in claim 1 wherein each mechanism comprises from about 1 to about 10 buttons.

5. A deck of flash cards as defined in claim 1 wherein at least one of said front or back comprises text or graphics related to the number of buttons.

6. A deck of flash cards as defined in claim 5 wherein the subject matter of said text or graphics represents at least one member selected from the group consisting of math, reading, sorting, matching, pattern recognition, cooking and the calendar.

7. A deck of flash cards as defined in claim 5 wherein said text or graphics represents at least one member selected from the group consisting of words and pictures.

8. A book comprising:
a front cover;
a back cover;
at least one leaf between said front cover and back cover, and a binding, wherein at least one of said front cover, back cover, and the at least one said leaf contains a front having at least one window and a back having at least one window, with the proviso that the front and back windows are located at a position that correspond to each other, and the front and back are adhered to one another; and,
wherein at least one of said window(s) comprises a push button mechanism, said push button mechanism having at least one button that is operable between two variable positions and is accessible through the front and back windows, and wherein the push button mechanism is made of a material that provides a clicking and/or popping noise when the position is changed.

9. A book as defined in claim 8 wherein said mechanism is comprised of plastic and said buttons are reversible protrusions in said plastic.

10. A book as defined in claim 9 wherein said buttons are circular in shape and the two variable positions are convex and concave.

11. A book as defined in claim 8 wherein said book comprises from about 1 to about 10 leaves.

12. A book as defined in claim 8 wherein each mechanism comprises from about 1 to about 10 buttons.

13. A book as defined in claim 8 wherein at least one said front or back comprises text or graphics related to the number of buttons.

14. A book as defined in claim 13 wherein the subject matter of said text or graphics represents at least one member selected from the group consisting of math, reading, sorting, matching, pattern recognition, cooking and the calendar.

15. A book as defined in claim 8 further comprising a compartment to contain media.

16. A book as in claim 15 wherein said compartment is removably attached to a cover of the book.

17. A book as defined in claim 13 wherein said text or graphics represents at least one member selected from the group consisting of words and pictures.

18. A book comprising: a front cover; a back cover; at least one leaf between said front cover and said back cover; a binding; and a compartment attached to said book wherein in said compartment there is contained at least one manipulative device comprising
a front having at least one window;
a back having at least one window, with the proviso that the front and back windows are located at a position that correspond to each other; and
at least one mechanism located between said front and back, said mechanism having at least one button that is operable between two variable positions and is accessible through the front and back windows, wherein the front and back are adhered to one another and the mechanism having at least one button is made of a material that provides a clicking and/or popping noise when the position is changed.

19. A book as in claim 18 wherein said manipulative device is a flash card or plate.

20. A book as in defined in claim 18 wherein said mechanism is comprised of plastic and said button is a reversible protrusion in said plastic.

21. A book as defined in claim 18 wherein said button is circular in shape and the two variable positions are convex and concave.

22. A book as in claim 18 wherein at least one said front or back comprises text or graphics related to the number of buttons.

23. A book as defined in claim 22 wherein the subject matter of said text or graphics represents at least one member selected from the group consisting of math, reading, sorting, matching, pattern recognition, cooking and the calendar.

24. A book as defined in claim 22 wherein said text or graphics represents words or pictures.

25. A flat surfaced device comprising:
a front having at least one window;
a back having at least one window, with the proviso that the front and back windows are located at a position that correspond to each other; and
at least one mechanism located between said front and back of the flat surface of the device, said mechanism having at least one button that is operable between two variable positions and is accessible through the front and back windows, wherein the front and back are adhered to one another and the mechanism having at least one button is made of a material that provides a clicking and/or popping noise when the position is changed.

26. A flat surfaced device as defined in claim 25 wherein said mechanism is comprised of plastic and said button is a reversible protrusion in said plastic.

27. A flat surfaced device as defined in claim 26 wherein said button is circular in shape and the two variable positions are convex and concave.

28. A flat surfaced device as defined in claim 25 wherein each mechanism comprises from about 1 to about 10 buttons.

29. A flat surfaced device as defined in claim 25 wherein at least one of said front or back comprises text or graphics related to the number of buttons.

30. A flat surfaced device as defined in claim 29 wherein the subject matter of said text or graphics represents at least one member selected from the group consisting of groceries, cooking ingredients, and manufacturing parts.

31. A flat surfaced device as defined in claim 29 wherein said text or graphics represents words or pictures.

32. A method of teaching an educational subject comprising the steps of:
(i) providing a student with a manipulative device comprising:
a front cover having at least one window;
a back a back having at least one window, with the proviso that the front and back windows are located at a position that correspond to each other, and at least one mechanism located between said front and back of the manipulative device, said mechanism having at least one button that is operable between two variable positions, and is accessible through the front and back windows, wherein the front and back are adhered to one another, and the mechanism having at least one button is made of a material that provides clicking and/or popping when the position is changed;
(ii) providing the student with graphics on said manipulative device; and
(iii) having the student change the position of said button to mark the occurrence of at least one event related to said graphics.

33. The method of claim 32 wherein the educational subject is at least one member selected from the group consisting of math, reading, sorting, matching, pattern recognition, cooking and the calendar.

34. The method of claim 32 wherein the manipulative device comprises at least one page of a book.

35. The method of claim 32 wherein the manipulative device comprises at least one flash card.

36. The method of claim 32 wherein the manipulative device comprises a plate.

37. A method of marking an occurrence comprising the steps of:
(i) providing a user with a manipulative device comprising:
a front having at least one window;
a back having at least one window, with the proviso that the front and back windows are located at a position that correspond to each other; and
at least one mechanism located between said front and back of the manipulative device, said mechanism having at least one button that is operable between two variable positions; and is accessible through the front and back windows; wherein the front and back are adhered to one another, and the mechanism having at least one button is made of a material that provides a clicking and/or popping noise when the position is changed;
(ii) providing the user with graphics on said manipulative device; and
(iii) having the user change the position of said button to mark the occurrence of at least one event related to said graphics.

38. The method of claim 37 wherein the manipulative device comprises at least one page of a book.

39. The method of claim 38 wherein the manipulative device comprises at least one flash card.

40. The method of claim 39 wherein the manipulative device comprises a plate.

41. The method of claim 37 wherein the subject matter of said text or graphics represents at least one member selected from the group consisting of groceries, cooking ingredients, and manufacturing parts.

* * * * *